United States Patent [19]
Calmettes et al.

[11] Patent Number: 5,249,830
[45] Date of Patent: Oct. 5, 1993

[54] DEVICE FOR LOCKING TWO COAXIAL TUBES

[75] Inventors: Lionel Calmettes, Romorantin-Lanthenay; Pascal Detable, Villedieu, both of

[73] Assignee: Etablissements Caillau, Issy-Les-Moulineaux, France

[21] Appl. No.: 768,430
[22] PCT Filed: Feb. 1, 1991
[86] PCT No.: PCT/FR91/00066
§ 371 Date: Sep. 26, 1991
§ 102(e) Date: Jun. 26, 1991
[87] PCT Pub. No.: WO91/11650
PCT Pub. Date: Aug. 8, 1991

[30] Foreign Application Priority Data
Feb. 2, 1990 [FR] France .............. 90 01260

[51] Int. Cl.$^5$ .............................................. F16L 33/20
[52] U.S. Cl. .............................. 285/319; 285/7; 285/29; 285/921
[58] Field of Search ............ 285/7, 26, 29, 399, 285/403, 319, 921; 403/329

[56] References Cited
U.S. PATENT DOCUMENTS

| | | | |
|---|---|---|---|
| 753,096 | 2/1904 | Osteen | 285/319 |
| 2,184,881 | 12/1939 | Martinet | 285/7 |
| 2,789,839 | 4/1957 | Siebert | 285/7 |
| 3,212,795 | 10/1965 | Helm et al. | 285/7 |
| 3,244,437 | 4/1966 | Belicka et al. | 285/7 |
| 3,245,698 | 4/1966 | Fromknelnt | 285/7 |
| 3,933,378 | 1/1976 | Sanford et al. | 285/319 |
| 3,950,014 | 4/1976 | Doubleday | 285/7 |
| 4,448,470 | 5/1984 | Peterson | 285/319 |
| 4,618,195 | 10/1986 | Keane | 285/7 |
| 4,969,667 | 11/1990 | Sauer | 285/319 |
| 5,104,253 | 4/1992 | Zielinski et al. | 403/329 |

FOREIGN PATENT DOCUMENTS

| | | |
|---|---|---|
| 4003461 | 8/1990 | Fed. Rep. of Germany . |
| WO89/09361 | 10/1989 | PCT Int'l Appl. . |
| 808 | of 1892 | United Kingdom ........ 285/319 |
| 9899 | of 1906 | United Kingdom ........ 285/319 |
| 2051283 | 1/1981 | United Kingdom . |

Primary Examiner—Eric K. Nicholson
Attorney, Agent, or Firm—Marshall & Melhorn

[57] ABSTRACT

Device for locking two coaxial tubes designed to be fitted into each other, comprising a longitudinal tab which is elastically flexible in the radial direction, connected to the outer tube and presenting at least one area capable of coming into axial abutment, once the two tubes have been fitted together, with a shoulder provided in register on the outer face of the inner tube and projecting radially with respect thereto. The wall of the outer tube 2 presents a groove 5, open at the end of the tube, whose lateral edges are parallel to the axis of the tube. The outer face of the inner tube 1 presents two radially projecting guide surfaces, said surfaces being parallel to the axis of the tube and spaced apart from each other by a distance substantially equal to the one separating the lateral edges of &he groove of the outer tube, whilst the free end of the locking tab 7 is located substantially in the transverse plane of the end of the outer tube.

11 Claims, 5 Drawing Sheets fig.5a fig.6a fig.5b fig.6b fig.7 fig.8 fig_9a fig_9b fig_11 fig_10a fig_10b fig_12 fig_13 fig_14 fig_15 fig_16

DEVICE FOR LOCKING TWO COAXIAL TUBES

In numerous industrial sectors, it is frequently necessary to immobilize two tubes after they have been fitted, generally with mild friction, which has rendered them coaxial one to the other. This is particularly the case when it is desired to proceed with connecting two conduits, for example those constituting elements of a cooling circuit in a vehicle motor. In that case, and particularly if the connection of the two conduits must be effected automatically by means of a motorized apparatus, such as a robot, it is necessary that immobilization of the two conduits be obtained by one movement, preferably in the course of the translation leading to the fit thereof.

More generally, the immobilization of two coaxial tubes may be sought after, both with regard to a relative rotation and to a translation, whenever it is desired to obtain an efficient mechanical connection between the two tubes.

Devices for effecting the desired immobilization have already been proposed, but, in general, when they are efficient with respect to somewhat high efforts aiming at disconnecting the tubes from each other, these devices comprise complementary screwing members or present considerable dimensions. These two drawbacks are no longer admissible in certain technical sectors, either for aesthetic reasons or also because of the small space available for placing in position the connection of the tubes. Finally, relatively high cost prices are frequently the consequence of the various drawbacks of the known devices for immobilizing two tubes.

However, US-A-3 933 378 has already sought to overcome the drawbacks of certain known devices and has described a quick connection of tubes, generally made of metal, but the device proposed by this prior document, apart from the fact that it is difficult to dismantle if it is used in encumbered zones, for example on a vehicle motor, does not allow an easy, visual check of the locking of the connection, since the locking members risk being hidden by a cage fixed to the inner tube On the other hand, German DE-A-3 815 168, 3 815 170, 3 815 171, 3 815 172, 3 815 173 and 3 914 645 have also proposed solutions to the problem of the quick connection of two tubes, thanks in particular to the use of flexible tabs borne by the outer tube and cooperating with a shoulder of the inner tube. However, these known devices, apart from the fact that they require relatively expensive manufacture, do not appear to procure in practice a sufficiently safe locking. Like the majority of the other known devices, they allow incorrect assemblies which must then be modified. This is in particular due to the fact that they possess a plurality of flexible tabs angularly offset in regular manner so that the "angular indexation" remains uncertain.

The present invention therefore has for its object a quick connection, of the above-mentioned type, ensuring by simple means the immobilization of two coaxial tubes, both with respect to an axial translation and to a relative rotation, and preventing any possibility of an incorrect assembly thanks to a certain "angular indexation". In the following, such a connection will be called "locking device" and it will be noted as from now that it will be advantageously used on devices for connecting two conduits, such as those described in the patent application filed by Applicants this day and entitled: "Device for connecting a flexible pipe on a rigid tubular joining piece".

Such a locking device comprises, in known manner, a longitudinal tab, elastically flexible in a radial direction, and connected to the outer tube. This tab presents at least one area which can axially abut, once the tubes have been fitted together, against a shoulder provided in register on the outer face of the inner tube and projecting radially therefrom.

According to the invention, the locking device is constituted by the combination of simple arrangements of the ends of the inner and outer tubes, designed to be fitted into each other. The wall of the outer tube presents a groove, open at the end of the tube, of which the lateral edges are parallel to the axis of the tube. On the other hand, the outer face of the inner tube presents two radially projecting guide surfaces, said surfaces being parallel to the axis of the tube and spaced apart from one another by a distance substantially equal to that separating the lateral edges of the groove in the outer tube. Finally, the free end of the flexible longitudinal tab, or locking tab, is located substantially in the transverse plane of the end of the outer tube.

Of course, the locking device may comprise two or more flexible tabs, as well as two or more grooves and pairs of guide surfaces, in a sufficient number. However, it appears that, in numerous applications, the multiplication of the end arrangements of the tubes will not be indispensable.

In any case, in the case of a plurality of flexible tabs, grooves and pairs of guide surfaces, it will be essential, in order to benefit from all the advantages of the invention, that these elements be irregularly distributed over the periphery of the corresponding tubes.

Thanks to the arrangements provided, axial locking and locking in rotation of two tubes fitted into each other is effected simply and in very reliable manner in the course of fit, without any other intervention. This operation may therefore be automatized by means of the machines available at present.

The invention will be more readily understood and various secondary characteristics as well as its advantages will appear in the course of the following description with reference to the accompanying drawings, in which:

FIG. 3 is a transverse section along III—III of FIG. 1a.

If reference is firstly made to FIGS. 1 to 4, an inner tube 1 is seen, designed to be fitted in an outer tube 2 in order to constitute an assembly of two coaxial tubes. The inner diameter of tube 2 is substantially equal to the outer diameter of tube 1. The walls of these two tubes have been shown with a relatively large thickness in order to facilitate the explanations of the arrangements provided at their opposite ends, but it is obvious, as will be emphasized hereinafter, that the invention imposes no particular requirement in this respect.

Figure 1A:
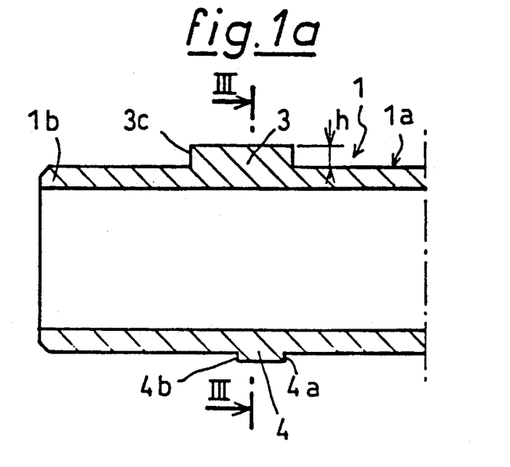
FIG. 1a and FIG. 1b are schematic views in axial section of the ends, arranged according to the invention, of two tubes before they are fitted together.
Figure 3:
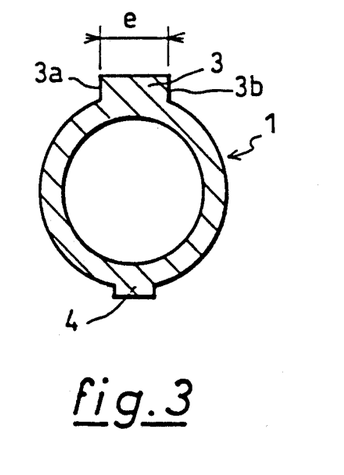

On the outer face 1a of the tube 1 are disposed a boss 3 and a protuberance 4, for example diametrically opposite boss 3.

Boss 3 presents a form generally elongated in the axial direction of tube 1 and its lateral faces 3a and 3b are parallel to the axis of the tube and project by a height h with respect to the outer surface 1a. Protuberance 4, generally of dimensions smaller than boss 3, may present a substantially square shape at least one of its axial ends 4a and 4b and in particular end 4a most remote from end 1b of the tube, being located in a transverse plane of tube 1, so as to constitute a transverse shoulder.

It will be noted that area 4b of protuberance 4 axially closest to end 1a of the tube, is, however, more remote from this end than the corresponding area 3c of boss 3. The reasons for this arrangement will appear hereinbelow.

Figure 1B:
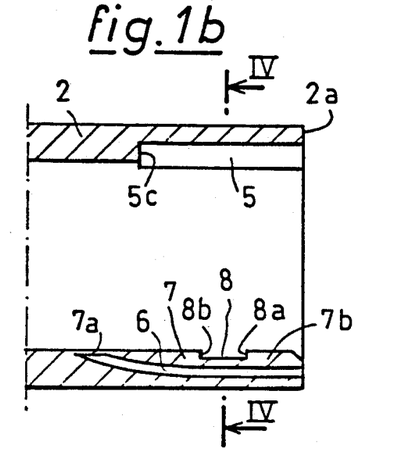
Figure 4:
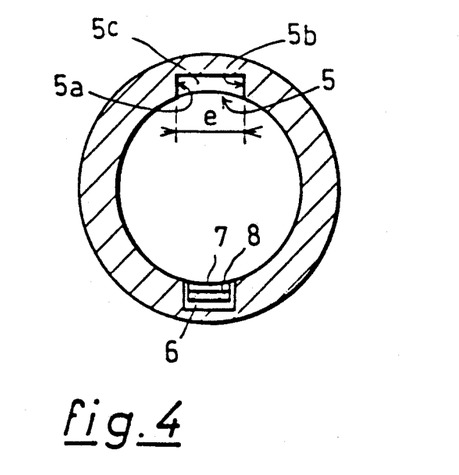
FIG. 4 is a transverse section along IV—IV of FIG. 1b.

On the inner face of the outer tube 2 is arranged a groove 5 whose lateral edges 5a and 5b are parallel to the axis of the tube and are spaced from each other by a distance e substantially equal to that separating the opposite lateral faces 3a and 3b of boss 3. The depth of the groove is at least equal to the radial projection h of the lateral faces 3a and 3b.

Groove 5 opens out at the end 2a of tube 2 and its axial length is preferably at least equal to that of boss 3. It is determined by a terminal face 5c whose position will be specified hereinafter.

Diametrically opposite groove 5 and housed in a recess 6 in the wall of tube 2, is located a longitudinal tab 7. In the free state and as shown in FIG. 1b, the inner face of tab 7 coincides substantially with the inner cylindrical surface of the wall of tube 2.

Tab 7 is fixed, in the vicinity of its inner end 7a, to the wall of tube 2 and its outer end 7b is located substantially in the transverse plane of the end 2a of tube 2, preferably inside the tube. The shape of tab 7 and/or its means for fixing to the wall of the tube render it elastically flexible or mobile, about a transverse axis located in the vicinity of its inner end 7a, inside recess 6.

In the vicinity of its outer end 7b, tab 7 presents a housing 8, for example of shape substantially identical to that of protuberance 4. It will be emphasized here that housing 8 may be constituted by a hole passing through the thickness of the tab. In the example shown, the depth of housing 8 is substantially equal to the radial projection of protuberance 4 with respect to the outer surface 1a of the tube 1. At least one of the longitudinal ends 8a and 8b of the housing 8, particularly end 8a close to end 7b of tab 7, is located in a transverse plane of tube 1, perpendicular to its inner surface. The axial distance between the two ends 8a and 8b is preferably substantially equal to that which separates the two axial ends 4a and 4b of protuberance 4.

The man skilled in the art will already have understood the functioning of the locking device which has just been described. The free end 1b is firstly fitted in the free end 2a, whatever the relative orientation of boss 3 and protuberance 4, groove 5 and tab 7.

When boss 3 comes into abutment on the end of tube 2, the movement of fit can be continued only after boss 3 and the terminal opening of groove 5 have been brought into register. The relative orientation of the outer tube and of the inner tube is then set and protuberance 4 is necessarily in line with tab 7.

Figure 2:
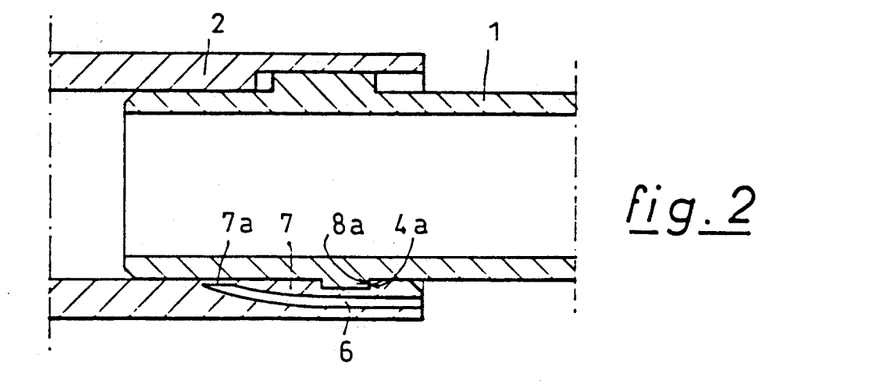
FIG. 2 is a view similar to the preceding ones after the tubes have been fitted together.

The movement of fit continues, the lateral faces 3a and 3b of the boss being guided by the lateral edges 5a and 5b of the groove. End 7b of tab 7 is raised by protuberance 4 and tab 7, in its entirety, is elastically pushed into recess 6. When protuberance 4 lies opposite housing 8, tab 7 returns into its initial position, housing 8 covering and imprisoning this protuberance. If, as has been indicated above, the axial ends 4a and 4b of protuberance 8a and 8b of the housing are perpendicular to the outer or inner surfaces of the tubes, they constitute complementary areas of axial abutment, ensuring axial immobilization of the two tubes with respect to each other, both in the sense of fit and in that of disconnection.

However, it might be imagined that only the axial ends 4a and 8a be shaped so as to constitute complementary areas of axial abutment, ensuring immobilization in the sense of disconnection. In that case, in order to limit the fit of the two tubes in each other, other means might be used. In particular, the length of the groove 5 might be determined so that its end 5a constitutes an area of axial abutment for the front longitudinal end 3c of boss 3, after shoulder 4a has attained or even slightly passed beyond the end 8a of housing 8.

Such an arrangement makes it possible to produce protuberance 4 in the form of a simple ramp for the end 7b of tab 7.

If reference is now made to FIGS. 5 to 8, an advantageous variant embodiment is seen which may be associated with a device for connecting a flexible pipe on a rigid tubular joining piece such as the one which forms the subject matter of the-patent application mentioned above. The elements already described bear the same references increased by 10. One of the principal differences between the two embodiments is that the outer tube is constituted by a thin metal sheet which may consequently be easily cut out and possibly formed by stamping.

Figure 5A:
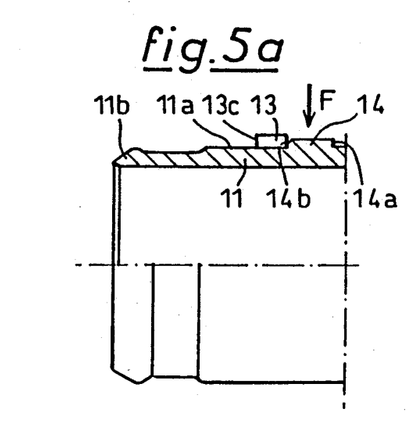
FIG. 5a and FIG. 5b, are views, partially in axial section, of the ends, arranged according to the invention, of two tubes before they are fitted together, in the case of a first advantageous variant embodiment.
Figure 6A:
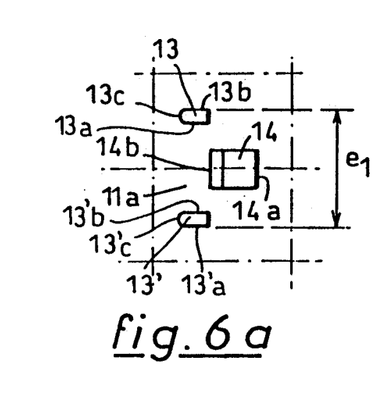
FIG. 6a and FIG. 6b are partial views, in the direction of arrows F, of the arrangements shown in FIGS. 5a and 5b.

As shown in the Figures, the outer tube 12 is an appendix in thin sheet metal, fixed to the end of a flexible pipe under the conditions set forth in the patent application mentioned above. It is intended to be fitted on a rigid joining piece or inner tube 11, generally made of plastics material. On the outer surface 11a is found protuberance 14 which is, however, associated with two bosses 13-13' disposed symmetrically with each other with respect to the diametral plane passing through the protuberance 14. However, it will be noted that to the assembly of the two bosses 13-13' there corresponds a distance $e_1$ between their opposite lateral faces 13b-13'a. On the other hand, the particularity, indicated hereinabove, is found again, whereby the area 14b of the protuberance 14, closest to the end 11b of the tube 11, is more remote from this end than the corresponding areas 13c of the bosses 13. The transverse shoulder 14a is substantially perpendicular to the outer surface 11a of the tube, whilst the opposite end 14b of the protuberance is preferably constituted by an inclined ramp.

Figure 5B:
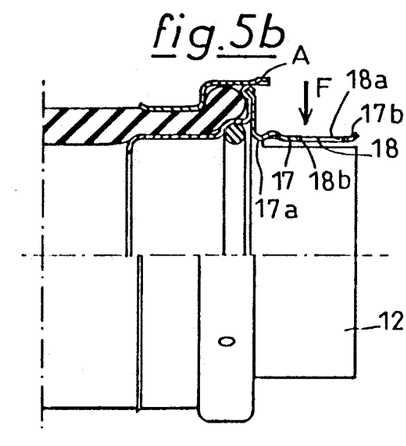
Figure 6B:
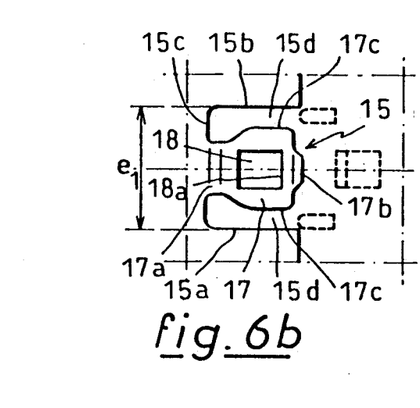

The outer tube 12 presents a longitudinal groove 15 whose two lateral edges 15a-15b are spaced apart by a distance $e_1$ substantially equal to that separating the opposite lateral faces 13b-13'a of bosses 13-13'.

Between edges 15a-15b of the groove there extends a longitudinal tab 17 of which the free end 17b is slightly curved outwardly. Tab 17 is obtained by a suitable cut-out of the wall of the outer tube 12 to which it remains fixed by its end 17a, preferably of smaller width, which constitutes an elastic zone of fold. In the free state, and as shown in FIG. 5b, tab 17 is located on the periphery of tube 12.

The longitudinal edges 17c of tab 17 are parallel to the edges 15a-15b of the groove and defines with them two secondary grooves 15d whose width is close to that of each of the bosses 13-13'.

Finally, tab 17 presents in its central part a hole 18 whose shape preferably corresponds to that of protuberance 14. More precisely, the transverse edge 18a is perpendicular to edges 15a-15b of the groove.

The positioning of the locking device is similar to that described hereinabove. The complete fit of tube 12 on tube 11 will obviously necessitate the correct offering of edges 15a-15b of groove 15 in line with the opposite lateral faces 13b-13'a of bosses 13-13' (position shown in interrupted lines in FIG. 6b). To that end, and particularly in the case of an automatized fit by means of a robot, there will advantageously be provided, on an element connected to tube 12, an appropriate indexing member designated by reference A. Continuation of the fit will firstly provoke cooperation of the guide surfaces 13b-13'a with the lateral edges 15a-15b of the groove, then the raising of tab 17, by the cooperation of its end 17b with the ramp 14b of protuberance 14. Locking is terminated when the transverse edge 18a of hole 18 has come into abutment behind the transverse shoulder 14a of protuberance 14, tab 17 then being elastically returned to its free state (FIGS. 7 and 8).

Immobilization in rotation of the two tubes 11 and 12 is ensured by the cooperation of edges 15a-15b of groove 15 and the lateral faces 13b-13'a of bosses 13-13', whilst axial immobilization in the sense of disconnection is obtained by the mutual abutment of edge 18a of hole 18 and of shoulder 14a of protuberance 14.

Figure 7:
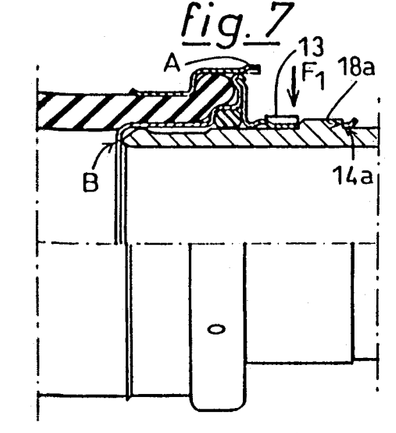
FIG. 7 is a view similar to FIGS. 5a and 5b after the tubes have been fitted together.
Figure 8:
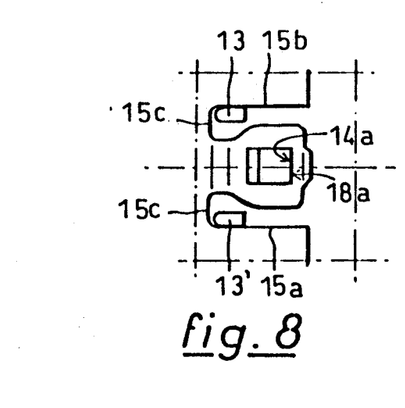
FIG. 8 is a partial view of the locking device, in the direction of arrow F1 of FIG. 7.

Axial immobilization in the sense of fit may be obtained by the abutment of bosses 13-13' on the bottom 15c of groove 15 or by any other suitable abutment of tube 11 on a stop connected to tube 12, such as the one indicated at B in FIG. 7.

If reference is now made to FIGS. 9 to 12, a second variant embodiment is seen, similar to the one which has just been described with reference to FIGS. 5 to 8. Like the preceding one, it will advantageously be associated with a device for connecting a flexible pipe on a rigid joining piece such as the one forming the subject matter of the patent application mentioned above. The elements already described bear the same references, again increased by 10. In the same way as in the preceding variant, the outer tube is constituted by a thin metal sheet which may be easily cut out and stamped.

Figure 9A:
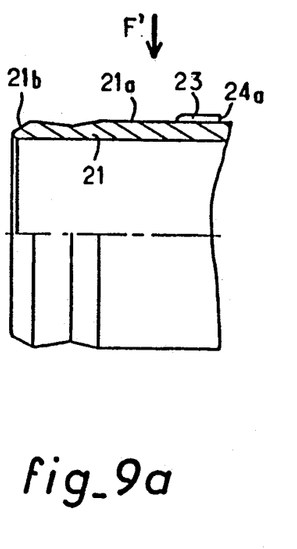
FIG. 9a and FIG. 9b are partial views in axial section of the ends, arranged according to the invention, of two tubes before they are fitted together, in the case of the second advantageous variant embodiment.
Figure 10A:
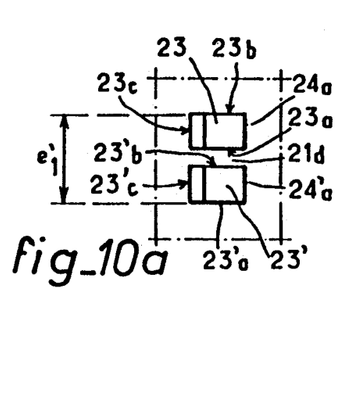
FIG. 10a and FIG. 10b are partial views, in the direction of arrows F', of the arrangements shown in FIGS. 9a and 9b.

On the outer surface 21a of the rigid joining piece 21, which constitutes the inner tube, there are found again two elongated bosses 23 and 23' whose opposite lateral faces 23b-23'a project radially and are parallel to the axis of the tube, being spaced apart from each other by a transverse distance $e'_1$. The longitudinal ends of these bosses are located in two transverse planes of the tube, preferably, as shown in the drawing, in the same transverse plane for each pair of corresponding ends. The ends 23c and 23'c closest to end 21b of the tube advantageously present the form of a ramp, whilst ends 24a and 24'a constitute shoulders projecting radially with respect to the outer surface 21a of the tube. Although bosses 23 and 23' may constitute only one, they will preferably be distinct from each other, their lateral faces 23a and 23'b being separated by a short distance so as to form a longitudinal notch 21d of which the utility will be apparent hereinafter.

The outer tube 22 presents a longitudinal groove 25 whose longitudinal edges 25a-25b are parallel to the axis of the tube and are spaced by a distance substantially equal to that separating the opposite lateral faces 23b-23'a of bosses 23-23'. As clearly shown in FIGS. 9b and 10b, edges 25a and 25b of the groove are preferably provided with small tabs 25c and 25d perpendicular to the plane of the groove and improving, as will be specified hereinbelow, the role of guiding of the edges of the groove.

A bridge 29 supporting the flexible longitudinal tab 27 is fixed to the outer tube 22 above groove 25. This bridge, preferably made of spring steel, comprises on each of its lateral edges a fold 29a whose left-hand end, slightly bent, abuts (FIG. 9b) on a protuberance 22a connected to tube 22 whilst its right-hand end is simply crimped on the rearwardly folded terminal end 22b of the tube 22 (FIG. 10b).

Figure 9B:
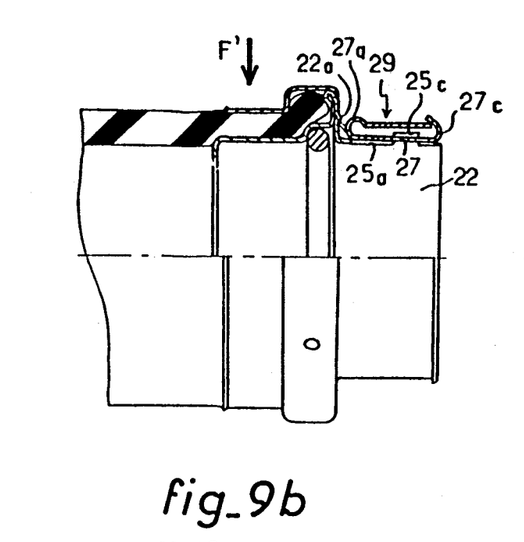
Figure 10B:
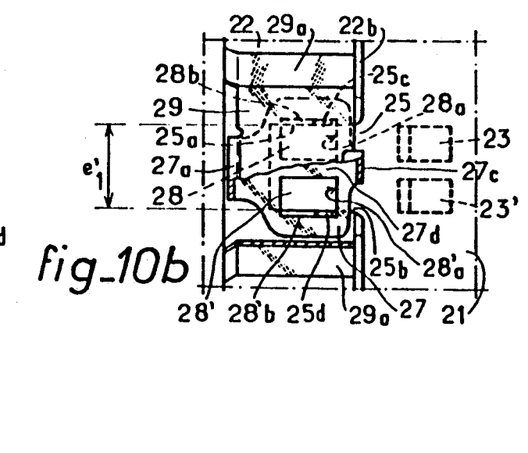

Tab 27 is constituted by a fold of the upper face of the bridge 29 joining it by a loop 27a, clearly visible in section in FIG. 9b. It presents a width substantially larger than that of groove 25 as shown in FIG. 10b. At its free end, located substantially in the transverse plane of the terminal edge 22b of the tube, tab 27 comprises a hook 27c folded on the upper face of bridge 29.

Tab 27 presents two openings 28 and 28' whose contour corresponds to that of bosses 23 and 23'. In particular, the transverse edges 28 and 28'a closest to the terminal edge 22b of the outer tube, are preferably in the same transverse plane, whilst the opposite longitudinal edges 28b and 28'b are advantageously offset laterally with respect to the edges 25a-25b of the groove, thus allowing passage of the tabs 25c and 25d in openings 28 and 28'.

In the example shown, there is a metal tongue 27d whose width corresponds to that of notch 21d between the bosses 23-23' and which participates in the mechanical strength of the terminal transverse edge of the tab 27. However, it is obvious that, if bosses 23-23' constitute only one, the same will apply to openings 28-28'

In the free state, tab 27 rests on the longitudinal edges of the groove 25 and is elastically maintained thereon by the spring constituted by loop 27a.

Figure 11:
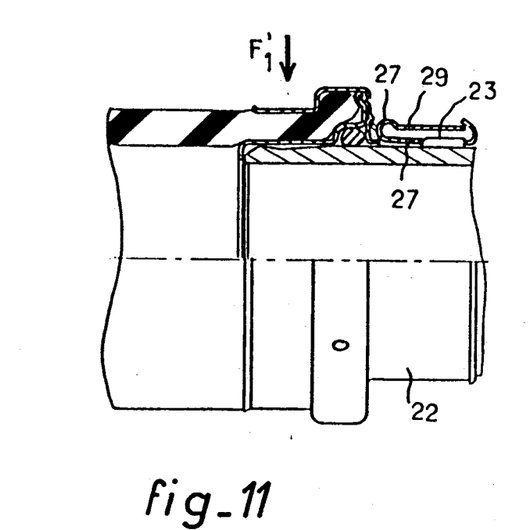
FIG. 11 is a view similar to FIGS. 9a and 9b after the have been fitted together.
Figure 12:
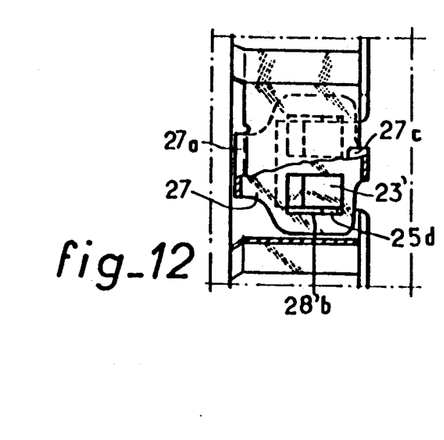
FIG. 12 is a partial view of the locking device in the direction of arrow $F_1'$ of FIG. 11.

The positioning of the locking device is similar to that which has been described hereinabove. After a correct offering of bosses 23-23' opposite the opening of groove 25 (position shown in interrupted lines in FIG. 10b), the fit of tube 21 in tube 22 firstly provokes raising of tab 27 by ramps 23c-23'c of the bosses. The lateral faces 23b-23'a of the latter are guided longitudinally by the edges 25a-25b of the groove and especially by their small tabs 25c-25d. At the end of the fit, the transverse edges 28a-28'a of the openings of the tab 27 come into axial abutment behind the shoulders 24a-24'a of the bosses 23-23', whilst tab 27 resumes the position that it occupied in the free state under the effect of its spring 27a (FIG. 11).

The two tubes are then immobilized axially and in rotation, both with respect to disconnection and in the sense of fit. In this respect, the arrangements described hereinabove can be used again here.

Whatever the embodiment envisaged, it will be generally advantageous to provide means for visually and easily checking the correct locking of the two tubes, i.e. the return of the locking tab to its position in the free state, after cooperation of the openings of the tab and of the shoulder provided in register on the outer surface of the inner tube.

Figure 13:
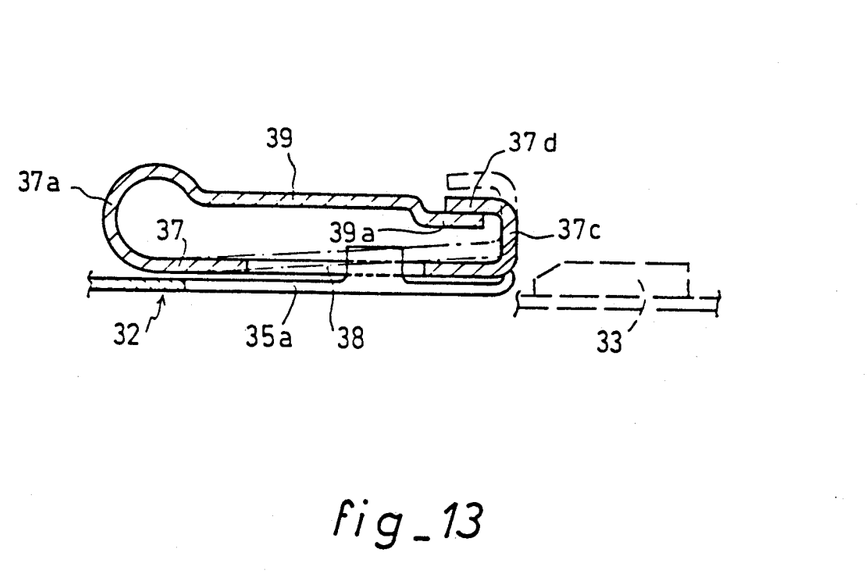
FIG. 13 is a view in detail of the bridge supporting the flexible pad, in the case of a first variant embodiment with respect to FIG. 9b.

To that end and if reference is now made to FIG. 13, an advantageous variant is seen of the bridge covering the groove of the outer tube and shown in FIGS. 9b and 10b. The elements already described bear the same reference numerals increased again by 10.

As has already been indicated, bridge 39 is disposed above the longitudinal groove formed in the outer tube 32 and the tab 37 is constituted by a fold connected to the bridge by the loop 37a. Towards the inlet of the groove, located to the right in FIG. 13, tab 37 terminates in a hook 37c folded above the upper face of the bridge.

The latter presents a bevel shoulder 39a whose depth corresponds substantially to the thickness of the metal sheet and whose width (in the direction perpendicular to the Figure) is advantageously close to that of the hook 37c. The latter presents a fold 37d whose plane is parallel to that of the tab 37.

In the course of fit of the tubes, boss 33 raises tab 37 and its fold 37d projects above the upper face of the bridge 39 (position in interrupted lines). After having been guided by the longitudinal edge 35a of the groove, boss 33 comes opposite opening 38 of tab 37. Under the effect of its spring 37a, tab 37 resumes the position shown in solid lines in the Figure, which ensures locking.

If for any reason fit of the tubes is not sufficient to provoke locking thereof, tab 37 and its fold 37d are maintained in the position shown in interrupted lines, which will easily be registered by the operator by a simple visual check.

Figure 14:
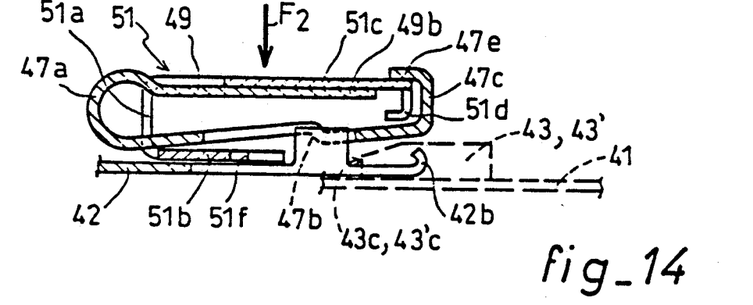
FIG. 14 is a view in detail of the bridge supporting the flexible tab, in the case of a second variant embodiment with respect to FIG. 9b.
Figure 15:
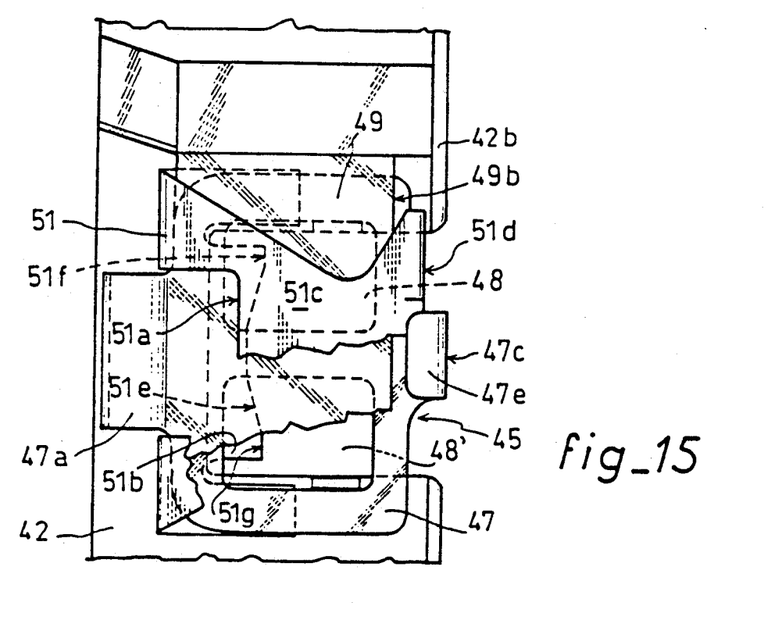
FIG. 15 is a view in the direction of arrow $F_2$ of FIG. 14.
Figure 16:
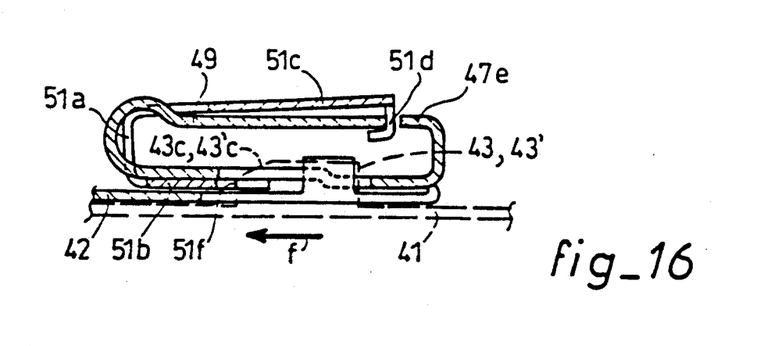
FIG. 16 is a view of the bridge shown in FIG. 14, after the two tubes have been fitted together.

Finally, if reference is made to FIGS. 14 to 16, another variant is seen of the means for visually checking locking. The elements already described and shown in FIGS. 9b and 10b bear the same references increased by 20.

Bridge 49 disposed above the groove of the outer tube 42 supports tab 47 via loop 47a forming spring. However, it will be noted that tab 47 presents a shoulder 47b whose utility will be apparent hereinafter, whilst its terminal hook 47c is located this side of the terminal edge 49c of bridge 49.

A staple 51 made of elastic material, preferably of spring steel, is constituted by a sheet folded in U-form surrounding bridge 49 and its tab 47. The web of the U is located in the area of loop 47a and presents a recess 51a, clearly visible in FIG. 15, allowing passage of loop 47a.

The lower arm 51b of the staple is located below tab 47 and extends this side of the shoulder 47b of the tab. The upper arm 51c of the staple extends above the upper face of bridge 49. In its central part, this upper arm 51c is capable of being in engagement (FIGS. 14 and 15) with the terminal fold 47e of the hook 47c of tab 47, whilst, on either side of this central part, it extends by hooks 51d directed towards the lower arm 51b.

Thus, staple 51 which has just been described constitutes a member mounted to slide axially with respect to bridge 49 and to its tab 47 and capable of being in engagement with an element of the latter. Moreover, for reasons which will be specified hereinafter, it should be noted here that, in the free state (not shown), arms 51b-51c of staple 51 are slightly divergent, so that they undergo an elastic deformation when they are disposed parallel to each other (FIG. 14). Staple 51 also constitutes a spring which tends to move the ends of its arms 51b and 51c apart from each other.

However, as shown in FIG. 15, the lower arm 51b of the staple presents a terminal edge 51a comprising, below the openings 48-48' of tab 47, two longitudinal projections 51f and 51g, closer to the end of the outer tube 42 then the rest of edge 5e is.

Before fit of tubes 41 and 42, staple 51 is in the position shown in FIG. 14, and the terminal central part of its upper arm 51c abuts beneath the terminal fold 47e of tab 47. The latter is therefore raised, against the spring constituted by its loop 47a, above the groove 45, whilst the upper arm 51c of the staple is applied on the upper face of bridge 49 and the spring constituted by the staple itself is compressed.

When bosses 43-43' are engaged in groove 45, they raise tab 47 further, if necessary, and their frontal face 43c-43'c comes into contact with the projections 51f-51g of the lower arm 51b of staple 51. The tubes continuing to be fitted, the bosses cause the lower arm 51b to slide in the direction of arrow f up to the position shown in FIG. 16. The terminal central part of the upper arm 51c then leaves its abutment beneath fold 47e, which releases tab 47 which therefore occupies its position of locking of tube 41 under the conditions already described.

Simultaneously, the upper arm 51c of the staple slackens elastically, taking a divergent position with respect to the lower arm 51b. Nonetheless, this movement remains limited thanks to the presence of the lateral hooks 51d which come into abutment beneath bridge 49. This position of staple 51 allows easy visual check of the locking by the operator.

In addition, to the same end, a coloured mark may be provided on the terminal central part of the upper arm 51c of the staple, in the area capable of being covered by the terminal fold 47e of tab 47. This mark therefore becomes visible only after tab 47 has arrived in its position of locking.

The variant which has just been described presents an important additional advantage with respect to the one shown in FIG. 13.

In fact, manufacturing defects of the bosses provided in the inner tube 41 may in fact be made, particularly if the latter is made of moulded plastics material. In that case it is important that fit of the tubes cannot be continued to its terminal phase and that the operator's attention be rapidly drawn to such defect.

If it is assumed, for example, that boss(es) 43–43' do(es) not exist, the simultaneous abutment of the frontal faces 43c–43'c on projections 51f–51g will not be produced. In that case, staple 51 will not normally slide, in the manner described hereinabove, which will prevent the terminal central part of the arm 51c from being released from the terminal fold 47e. The operator will therefore be immediately warned of the anomaly by a simple visual check.

Moreover, if only one of projections 51f–51g is attained by the boss(es), staple 51 will pivot instead of sliding, again preventing the disengagement of elements 51c and 47e and consequently drawing the operator's attention.

As the man skilled in the art will have realized, the arrangements proposed by the invention may be produced in very economical manner despite the large number of advantages that they procure. In particular, safe assembly and functioning will be especially useful and appreciated in the case of the inner and outer tubes being fitted together by automatized apparatus.

We claim:

1. A coupling device for providing a separable connection between and end of a first tubular member and an end of a corresponding second tubular member, said coupling device comprising:

a) a tubular assembly mounted on the end of the first tubular member, said assembly including a circumferential wall extending longitudinally from the first tubular member, the wall having a longitudinal groove formed at an outer end of the wall;

b) at least one boss located on an outer surface of the second tubular member and projecting radially therefrom.

c) a locking tab member affixed to said tubular assembly and extending longitudinally from the first tubular member such that said locking tab member is located adjacent the groove on the outer surface of the circumferential wall, said locking tab member being elastically flexible in the radial direction and including an aperture for receiving each boss on the outer surface of the second tubular member, whereby the second tubular member may be inserted into said tubular assembly when the boss on the second tubular member is aligned in the groove such that said locking tab member will, upon insertion of the second tubular member into the tubular assembly, extend radially outward until the boss is received by the aperture in said locking tab member to separably lock the second tubular member to the first tubular member.

2. The coupling device defined in claim 1 wherein said locking tab member includes an elastically flexible locking tab with aperture adjacent the groove on the outer surface of the circumferential wall, the locking tab being connected by an integrally formed spring end loop to a support bridge surface generally parallel to and spaced apart from the locking tab, the locking tab and the support bridge surface each having a free end at the outer end of the circumferential wall.

3. The coupling device defined in claim 2 wherein the locking tab, spring end loop, and support bridge surface ar integrally formed form a piece of spring steel.

4. The coupling device defined in claim 2 wherein the support bridge surface includes a pair of lateral edges for securing the locking tab member to the circumferential wall of said tubular assembly.

5. The coupling device defined in claim 2 wherein said locking tab is elastically flexible in the radial direction such that the locking tab will be radially flexed by said boss on the second tubular member to indicate an unlocked position when the second tubular member is inserted into said tubular assembly and the locking tab will return to an unflexed-locked position when said boss is received by the aperture in said locking tab whereby the locked-unlocked status of the coupling device may be visually determined by observing the position of the locking tab.

6. The coupling device defined in claim 5 wherein the locking tab includes a hook formed on the free end of the locking tab, an outer end of the hook extending beyond an outer surface of the support bridge surface.

7. The coupling device defined in claim 6 wherein the support bridge surface includes a recess formed in the outer surface of the support bridge surface at the free end for receiving the outer end of the hook, whereby, upon insertion of the second tubular element into the tubular assembly, the hook is located in said recess when the coupling device is locked, and the hook extends from the recess in a visually distinguishable position when the coupling device is unlocked.

8. The coupling device defined in claim 6 including a O-shaped stable member slidably positioned about said locking tab member, said staple member being aligned axially and having a lower arm for slidably engaging said boss when said boss is inserted into the groove and an upper arm for engaging the hook on the locking tab, whereby the upper arm retains the locking tab in an unlocked position prior to the coupling of the first and second tubular members, and said boss causes the staple member to slide in an axial direction upon insertion of the second tubular member into the tubular assembly, which disengages the upper arm from the hook on the locking tab and permits the locking tab to change to a locked position only after the second tubular member has been fully inserted and said boss is positioned in the aperture of the locking tab.

9. The coupling device defined in claim 8 wherein the upper arm of said U-shaped staple member includes a visible marking on an outer end of the upper arm whereby the marking is covered by the hook of the locking tab when the locking tab is in an unlocked position, and the marking is uncovered and visible when the staple member is slidably engaged by said boss and the locking tab moves to a locked position.

10. The coupling device defined in claim 1 wherein the locking tab member includes two apertures separated by a longitudinal tongue, and the second tubular member includes two spaced apart bosses, the two bosses being sized and positioned for insertion into the apertures of the locking tab member.

11. The coupling device defined in claim 1 wherein said tubular assembly is made from sheet metal.

* * * * *